(12) United States Patent
Potyen et al.

(10) Patent No.: US 7,750,168 B2
(45) Date of Patent: Jul. 6, 2010

(54) STABILIZED DEUTEROBORANE-TETRAHYDROFURAN COMPLEX

(75) Inventors: Mark C. Potyen, Sheboygan, WI (US); Kanth V. B. Josyula, Germantown, WI (US); Peng Gao, Mequon, WI (US); Christopher Dudley Hewitt, Shorewood, WI (US); Robert Todd, Sheboygan, WI (US)

(73) Assignee: Sigma-Aldrich Co., St. Louis, MO (US)

( * ) Notice: Subject to any disclaimer, the term of this patent is extended or adjusted under 35 U.S.C. 154(b) by 739 days.

(21) Appl. No.: 11/672,808

(22) Filed: Feb. 8, 2007

(65) Prior Publication Data

US 2007/0197695 A1    Aug. 23, 2007

Related U.S. Application Data

(60) Provisional application No. 60/772,459, filed on Feb. 10, 2006.

(51) Int. Cl.
    *C07D 305/06*    (2006.01)
(52) U.S. Cl. .................................................... 549/213
(58) Field of Classification Search ................ 549/213
    See application file for complete search history.

(56) References Cited

U.S. PATENT DOCUMENTS

| | | |
|---|---|---|
| 3,609,191 A | 9/1971 | Wade |
| 3,634,277 A | 1/1972 | Brown |
| 3,882,037 A | 5/1975 | Brown |
| 4,008,282 A | 2/1977 | Townsend |
| 4,029,712 A | 6/1977 | Tsuchihashi |
| 4,390,729 A | 6/1983 | Oswald |
| 4,503,178 A | 3/1985 | Green |
| 5,100,854 A | 3/1992 | Maeda et al. |
| 5,250,736 A | 10/1993 | Micklethwaite et al. |
| 5,260,485 A | 11/1993 | Calbick et al. |
| 5,466,798 A | 11/1995 | Singaram et al. |
| 5,481,038 A | 1/1996 | Brown |
| 5,504,240 A | 4/1996 | Brown |
| 5,543,569 A | 8/1996 | Brown |
| 5,567,849 A | 10/1996 | Brown |
| 5,663,419 A | 9/1997 | Sugiya et al. |
| 6,048,985 A | 4/2000 | Burkhardt et al. |
| 6,218,585 B1 | 4/2001 | Matos et al. |
| 6,248,885 B1 | 6/2001 | Brown |
| 6,545,183 B1 | 4/2003 | Berens |
| 6,610,894 B2 | 8/2003 | Matos et al. |

OTHER PUBLICATIONS

M. Follet, "Use of Complexes of Diborane and Organoboranes on a Laboratory and Industrial Scale", Chemistry and Industry Journal, 1986, pp. 123-128.

K. Smith, "Advances in Organometallic Chemistry—Prospects for Industry", Chemistry and Industry Journal, 1987, pp. 603-611.

Clinton F. Lane, "Reduction of Organic Compounds with Diborane", Chemical Reviews, 1976, pp. 773-799.

Herbert C. Brown, Manoj C. Desai, Prabhakar K. Jadhav, "Diisopinocampheylborane of High Optical Purity. Improved Preparation and Asymmetric Hydroboration of Representative Cis-Disubstituted Alkenes", Journal of Organic Chemistry, 1982, pp. 5065-5069, vol. 47.

Herbert C. Brown, Peter Heim, Nung Min Yoon, "Reaction of Diborane in Tetrahydrofuran with Selected Organic Compounds Containing Representative Functional Groups", Journal of American Chemical Society, pp. 1637-1646, vol. 92, (1970).

*Primary Examiner*—Bernard Dentz
(74) *Attorney, Agent, or Firm*—Senniger Powers LLP; Jill Rogers-Manning

(57) ABSTRACT

A stabilized deuteroborane-tetrahydrofuran complex is disclosed. Also disclosed are processes for the preparation of the deuteroborane-tetrahydrofuran complex and methods of storing and transporting the prepared complex. The deuteroborane-tetrahydrofuran complexes exhibit enhanced shelf life and increased self-accelerated decomposition temperatures.

25 Claims, No Drawings

STABILIZED DEUTEROBORANE-TETRAHYDROFURAN COMPLEX

Applicants claim the priority of Provisional Application 60/772,459 filed Feb. 10, 2006.

BACKGROUND OF THE INVENTION

Deuterated diborane ($B_2D_xH_{6-x}$), where x is 2 to 6, is a versatile reagent with broad applications in organic and inorganic syntheses. Because deuterated diborane is a pyrophoric gas having a flash point of about −90° C. and an autoignition temperature of about 38° C. to 51° C., borane complexes with Lewis bases are typically used instead, as they are more convenient to handle. Numerous examples of these borane complexes for use in the synthesis of pharmaceuticals and other industrial applications are well known in the art. Deuteroborane-tetrahydrofuran complex (referred to as "BD-THF" or "BD-THF complex") is especially suitable for use as borane-Lewis base complexes for synthetic applications, such as hydroboration of carbon-carbon double and triple bonds, and reduction of various functional groups used in the preparation of tracer compounds and compounds having improved functionality.

Problematically, BD-THF solutions having a concentration in excess of about 2.0 moles per liter ("M") readily release diborane (where diborane includes the deuterated and partially deuterated forms). Under the United States Department of Transportation ("DOT") regulations, transportation of a package containing a material which is likely to decompose with a self-accelerated decomposition temperature (SADT) of 50° C. or less with an evolution of a dangerous quantity of heat or gas when decomposing is prohibited unless the material is stabilized or inhibited in a manner to preclude such evolution. Because of the intrinsic instability and low autoignition temperature, BD-THF solutions having a concentration in excess of about 1M generally cannot meet the SADT mandated by the DOT. Aside from resulting in unacceptable SADT temperatures, diborane exhibits high vapor pressure at room temperature resulting in overpressurization of storage containers. Moreover, diborane can attack the tetrahydrofuran ("THF") cyclic ether linkage causing ring opening thereby resulting in less pure BD-THF and concomitant heat generation and container pressurization.

Another problem associated with BD-THF complexes is short shelf life, especially at temperatures at or above normal room temperature of about 25° C. BD-THF complexes can decompose during shipping or in storage if they are not stabilized properly, or are shipped at elevated temperature.

In the interest of conservation of resources and efficient use of reactor vessels, one would like to conduct reactions at the highest concentration possible for a particular reaction. In that regard, low BD-THF concentration leads to low reactor loading and inefficient use of equipment.

A need exists for concentrated stabilized BD-THF solutions suitable for the use in the preparation of deuterated organic and inorganic compounds.

SUMMARY OF THE INVENTION

Among the various aspects of the present invention are stabilized BD-THF complex solutions, processes for their preparation, and methods of storing and transporting those solutions.

Briefly, therefore, the present invention is directed to a solution containing a BD-THF complex, tetrahydrofuran and a stabilizer. The stabilizer is selected from the group consisting of amines, sulfides, phosphines, aminoborohydrides, borates, and combinations thereof. The deuteroborane is of the formula $BD_yH_{3-y}$ wherein y is from 1 to 3. The concentration of the BD-THF complex in the solution is at least about 0.5M, and the molar ratio of the BD-THF complex to the stabilizer is at least 10:1.

The present invention is further directed to a process for the preparation of a stabilized BD-THF complex in a solution containing tetrahydrofuran. The process comprises forming a solution containing BD-THF complex in a solvent system comprising tetrahydrofuran, the concentration of the BD-THF complex in the solution being at least about 0.5M. A stabilizer is combined with the solvent system in a molar ratio of the BD-THF complex to the stabilizer in the solution of at least 10:1, the stabilizer being selected from the group consisting of amines, sulfides, phosphines, aminoborohydrides, borates, and combinations thereof. The deuteroborane is of the formula $BD_yH_{3-y}$ wherein y is from 1 to 3. The process steps can be carried out in any order.

The present invention is further directed to a method of storing and transporting a solution containing at least about 0.5M of a BD-THF complex in solution in a solvent system comprising tetrahydrofuran. The solution further comprises a stabilizer selected from the group consisting of amines, sulfides, phosphines, aminoborohydrides, borates, and combinations thereof wherein the molar ratio of the BD-THF complex to the stabilizer is at least 10:1. The deuteroborane is of the formula $BD_yH_{3-y}$ wherein y is from 1 to 3. The method comprises sealing the liquid BD-THF complex solution in a container having a storage volume of at least 0.10 liters and transporting the sealed container to another location.

The present invention is further directed to a method of storing and transporting a solution containing at least about 0.5M of a BD-THF complex in a solvent system containing tetrahydrofuran. The solution is sealed in a container having a free space occupied by a gas. The ratio of the surface area of the gas-solution interface to the volume of the solution in the sealed container is about 2 $cm^2$ per liter to about 200 $cm^2$ per liter. The sealed container can then be transported.

Other objects and features of this invention will be in part apparent and in part pointed out hereinafter.

DETAILED DESCRIPTION OF THE INVENTION

In accordance with the present invention, stabilized deuterated and partially deuterated BD-THF complex solutions having a BD-THF concentration of at least about 0.5M are provided. The deuteroborane is of the formula $BD_yH_{3-y}$ wherein y is from 1 to 3. In one embodiment, the deuteroborane is $BD_3$. As compared to BD-THF solutions known in the art, such stabilized solutions have an increased shelf life at temperatures of at least about 5° C., an elevated SADT temperature of at least about 50° C., or both.

BD-THF is a selective reducing agent that can be effectively used in organic and inorganic synthesis to prepare a wide variety of compounds containing deuterium. Deuterated compounds typically fall into one of two general classifications. In a first classification, the deuterated compounds possess essentially identical physical properties and characteristics as their non-deuterated analogs such that each analog, for instance, is metabolized similarly in organisms, moves through the environment in a similar manner or behaves similarly in reaction systems. However, the deuterated compound can be qualitatively and/or quantitatively measured and differentiated from its non-deuterated analog by an analytical method such as spectroscopy, for example, nuclear magnetic resonance ("NMR"). Those properties make deuterated compounds especially suited for many purposes including as internal standards for spectroscopy or other analytical methods and as tracer compounds for drug and environmental studies. For example, deuterium-labeled organic and organometallic compounds are widely used in spectroscopic experiments and in studies aimed at the elucidation of chemical structure and reaction mechanisms (see, for example, U.S. Pat. No. 6,794,522 to Bergman et al.). In a second classification, deuterium can change the physical properties and characteristics of compounds as compared their non-deuterated analog thereby leading to improved functionality. For example, deuterium can increase the density of imaging agents thereby improving resolution (see, for example, U.S. Pat. No. 4,893,627 to Kehayias et al.). Deuteration can yield pharmaceuticals having improved bioavailability and reduced the toxicity. Deuterated compounds can improve the frequency response characteristics of nonlinear chemical compounds useful in the fabrication of optoelectronic devices (see, for example, U.S. Pat. No. 5,332,827 to Stewart et al.). Deuterated diborane can be used as a sintering agent for the preparation of semi-conductors having reduced hydrogen content within the finished device (see, for example, U.S. Pat. No. 6,077,791 to DeTar). Deuterated solvents have been described as being superior to the non-deuterated analog and as having reduced mammalian toxicity (see, for example, U.S. Pat. No. 4,967,021 to Meyers et al.). Finally, through the "deuterium isotope effect", i.e., where the C-D bond has a greater dissociation energy than the C—H bond, deuterated elastomeric copolymers having improved oxidation resistance can be prepared (see, for example, U.S. Pat. No. 4,914,160 to Azizian).

In general, BD-THF complexes are prepared by generating in a reaction vessel deuterated or partially deuterated diborane gas ($BD_xH_{6-x}$ where x is 2 to 6), decomposing that gas to give deuterated or partially deuterated borane gas ($B_yD_{3-y}$ where y is 1 to 3) and then transferring the borane gas to a receiving vessel containing THF where the borane is absorbed and dissolved into the THF to yield $B_yD_{3-y}$-THF. $BD_xH_{6-x}$ can generally be prepared by any method known to those skilled in the art for the preparation of non-deuterated diborane, but where one or more hydrogen atoms of the diborane precursors are replaced with deuterium. For example, $BD_xH_{6-x}$ could be prepared by the methods referenced in *The Merck Index*, 13th Ed. (2001), entry 3039 at page 531. For instance, $BD_xH_{6-x}$ could be prepared by pyrolysis at 550° C. to 950° C. of $BCl_3$ and $D_2$ (see U.S. Pat. No. 4,070,261 to Merritt et al.), by reacting polymeric boron monoxide with $D_2$ at 550° C. to 950° C. (see U.S. Pat. No. 3,021,197 to Clark et al.) or by reacting ammonium chloride and sodium borodeuteride in a suitable solvent (see U.S. Pat. No. 5,439,932 to Tsuchiya).

In one embodiment for the preparation of BD-THF, in a generation reaction step, diborane ($B_2D_xH_{6-x}$) is prepared in a reaction vessel from a reaction mixture comprising sodium borodeuteride and boron trifluoride etherate in a solvent according to following general reaction sequence (1) comprising the indicated reactants and products:

(1)

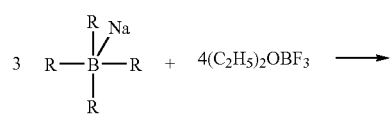

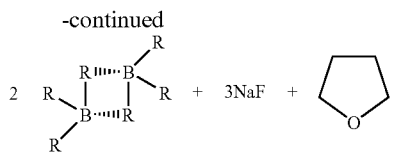

wherein each R is independently $^2H$ (deuterium) or hydrogen and at least two R groups in the diborane compound are deuterium. A suitable solvent includes 2,5,8,11-tetraoxadecane (i.e., triglyme). In the diborane preparation reaction sequence, sodium borodeuteride and the solvent are combined with agitation to form a slurry that is then cooled to less than about 10° C., for example about 0° C. to about 5° C. A weight per volume ratio of sodium borodeuteride to solvent of about 1 to about 2, about 1 to about 4, or even about 1 to about 6 is preferred. Boron trifluoride etherate is added with agitation to the slurry while maintaining the temperature below about 10° C., for example about 0° C. to about 5° C. Any mole ratio of boron trifluoride etherate to sodium borodeuteride that provides commercially practical yield and quality is generally acceptable. A mole ratio of boron trifluoride etherate to sodium borodeuteride of from about 1:1.3 to about 1.5:1, or even from about 1.25:1 to about 1.45:1, for example about 1.33:1, is preferred. It is generally preferred to add the boron trifluoride etherate over a predetermined time period such as from about 30 minutes to about 3 hours, from about 45 minutes to about 2 hours, or even from about one to about 1.5 hours. During boron trifluoride etherate addition, nitrogen gas is typically continuously purged through the reaction vessel to transfer any borane that forms from diborane decomposition to a receiving vessel containing THF.

In a generation reaction second step, after the boron trifluoride etherate addition is complete, the reactor mixture comprising diborane is heated to about 20° C. to about 60° C., from about 30° C. to about 50° C., or from even from about 35° C. to about 45° C. with agitation and under a nitrogen purge and held under those conditions for a time period of up to about 4 hours to decompose diborane to borane gas according to reaction sequence 2:

(2)

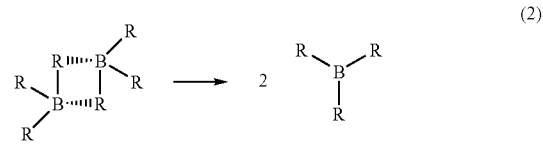

wherein the borane compound R group is independently deuterium or hydrogen and at least one R group is deuterium. During diborane decomposition, the diborane gas is continuously removed from the reaction vessel with the nitrogen purge and transferred to the receiving vessel.

In the BD-THF formation step, borane gas from the generation reaction vessel is absorbed and dissolved into THF contained in the receiving vessel to form the BD-THF complex. A concentration of the BD-THF in the composition of at least about 0.5M, at least about 1.0M, at least about 1.5M, at least about 2.0M, or even as high as about 2.5M is preferred.

In general, temperature stability or SADT temperature elevation of BD-THF solutions having a concentration in excess of about 0.5M, for example 1.0M, 1.5M, 2.0M or even 2.5M can be achieved by including in the THF solution, a stabilizer selected from the group consisting of amines, sulfides, phosphines, aminoborohydrides, borates, and combinations thereof. Preferred amines include non-cyclic and cyclic secondary and tertiary amines, amine oxides, and metal amides. Preferred phosphines include the non-cyclic and cyclic secondary and tertiary forms, and phosphine oxides. Preferred sulfides include the secondary non-cyclic and cyclic forms, and sulfoxides. Preferred borates include boric acid esters and tetralkoxyborate salts.

Such stabilizers offer particular utility in stabilizing THF solutions containing at least 0.5M of dissolved BD-THF. Typically, the stabilized THF solution has a dissolved BD-THF concentration not in excess of 2.5M. In one preferred embodiment, the stabilized solution has a dissolved BD-THF concentration of about 1M to about 2.5M; in another preferred embodiment, the stabilized solution has a dissolved BD-THF concentration of about 1M to about 2M; in another preferred embodiment, the stabilized solution has a dissolved BD-THF concentration of about 1M to about 1.5M; in another preferred embodiment, the stabilized solution has a dissolved BD-THF concentration of about 1.5M to about 2.5M; in yet another preferred embodiment, the stabilized solution has a dissolved BD-THF concentration of about 1.5M to about 2M; and in yet another preferred embodiment, the stabilized solution has a dissolved BD-THF concentration of about 2M to about 2.5M.

Without being bound to any particular theory, it has been proposed that the stabilizers scavenge diborane through the formation of a stabilizer-diborane complex having a dynamic equilibrium in THF solution sufficient to deliver borane back to THF and reform BD-THF. Stabilization can be represented by reaction sequence (3):

(3)

wherein x is 2 to 6 and y is independently 1 to 3. Regardless of mechanism, the stabilizers of the present invention yield BD-THF complex solutions having a greater SADT temperature, longer shelf life at ambient temperature, or both, than stabilized BD-THF solutions previously known in the art.

In general, a molar ratio excess of BD-THF to stabilizer(s) in the THF solution is preferred. Preferably, the molar ratio of BD-THF to stabilizer(s) is greater than about 10:1, respectively. More preferably, the molar ratio of BD-THF to stabilizer(s) in the THF solution is between 10:1 and 10,000:1, respectively. In one preferred embodiment, the molar ratio of BD-THF to stabilizer(s) in the THF solution is about 50:1 to about 1000:1, respectively. In another preferred embodiment, the molar ratio of BD-THF to stabilizer(s) in the THF solution is between 100:1 and 500:1, respectively.

The stabilizer(s) of the present invention may be fully dissolved in the THF solution or, alternatively, immobilized onto a polymeric or other solid support, or be present within the matrix of a polymeric or other solid support. Thus, for example, when a secondary or tertiary amine is used as a stabilizer, it may be dissolved in the THF solution; alternatively, it may be immobilized onto or in a resin particle or other solid combined with the THF solution. For example, the stabilizer may be immobilized on a resin particle added to the THF solution or immobilized to the inner wall of a container holding the THF solution. Furthermore, combinations of stabilizers may be used in each of these permutations. Thus, for example, an immobilized secondary or tertiary amine may be used in combination with one or more dissolved stabilizers selected from the group consisting of secondary or tertiary amines, sulfides, phosphines, borates and aminoborohydrides. Regardless, it is generally preferred that the molar ratio of BD-THF to all such stabilizer(s) in the THF solution (regardless of whether they are immobilized or dissolved) be between 10:1 and 10,000:1, respectively. In one embodiment, the stabilizer consists of only the secondary or tertiary amine; that is, the stabilizer does not additionally comprise an aminoborohydride, metal amide, sulfide, phosphine, borate, or borohydride. In another embodiment, a combination of two or more of these stabilizers is used.

In one preferred embodiment, the THF solution contains an amine BD-THF stabilizer such as a non-cyclic secondary amine, tertiary-amine, amine-N-oxide, aminoborane or metal amide. Preferred non-cyclic secondary and tertiary amines are represented by chemical formula (Ia):

(Ia)

preferred amine-N-oxides are represented by chemical formula (Ib):

(Ib)

preferred aminoboranes are represented by chemical formula (Ic):

(Ic)

and preferred metal amides are represented by chemical formula (Id):

R₁R₂N⁻M⁺ (Id)

wherein, for tertiary amines and amine oxides, $R_1$, $R_2$ and $R_3$ are independently selected from aryl, heteroaryl, straight or branched chain alkyl, alkene or alkoxy having 1 to 8 carbon atoms, cycloalkyl having 3 to 8 carbon atoms, and tri-substituted silyl. For secondary amines and amine oxides, one of $R_1$, $R_2$ or $R_3$ as defined above is hydrogen. For metal amides, $R_1$ and $R_2$ are independently selected from aryl, heteroaryl, straight or branched chain alkyl, alkene or alkoxy having 1 to 8 carbon atoms, cycloalkyl having 3 to 8 carbon atoms, and tri-substituted silyl. A preferred aryl is phenyl ($C_6H_5$). In one embodiment, $R_1$ is selected from the group consisting of hydrogen, methyl, ethyl, n-propyl, i-propyl, n-butyl, i-butyl, t-butyl, sec-butyl, t-octyl, ethyl ether, ethyl methyl ether, methylallyl, phenyl and trimethylsilyl, and $R_2$ and $R_3$ are independently selected from the group consisting of methyl, ethyl, n-propyl, i-propyl, n-butyl, i-butyl, t-butyl, sec-butyl, t-octyl, ethyl ether, ethyl methyl ether, methylallyl, phenyl and trimethylsilyl. $M^+$ is any suitable counterion with metals such as sodium, potassium or lithium being preferred. The silyl may be substituted with the groups independently selected from hydrogen, phenyl, straight or branched chain alkyl, alkene or alkoxy having 1 to 8 carbon atoms, and cycloalkyl having 3 to 8 carbon atoms. A preferred silyl is trimethylsilyl. Secondary and tertiary amines of formula (Ia) are known in the art. See for example U.S. Pat. Nos. 5,481,038, 5,543,569 and 6,248,885 to Brown, all of which are incorporated by reference.

Representative non-cyclic tertiary amine stabilizers are indicated in Table 1. Representative amine oxides can be derived from Table 1 where $R_1$, $R_2$ and $R_3$ can be any one of the listed moieties. Representative metal amides can be derived from Table 1 where $R_1$ and $R_2$ can be any one of the listed moieties. Representative non-cyclic secondary amine stabilizers can be derived from the compounds of Table 1 where any one of $R_1$, $R_2$ and $R_3$ is hydrogen instead of the listed moiety.

TABLE 1

| Stabilizer | $R_1$ | $R_2$ | $R_3$ |
|---|---|---|---|
| 1 | $C_6H_5$ | i-butyl | methyl |
| 2 | $C_6H_5$ | i-butyl | ethyl |
| 3 | $C_6H_5$ | i-butyl | i-butyl |
| 4 | $C_6H_5$ | i-butyl | n-propyl |
| 5 | $C_6H_5$ | i-propyl | methyl |
| 6 | $C_6H_5$ | i-propyl | ethyl |
| 7 | $C_6H_5$ | i-propyl | n-propyl |
| 8 | $C_6H_5$ | i-propyl | i-propyl |
| 9 | t-butyl | —$CH_2CH_2OCH_2CH_2$ | —$CH_2CH_2OCH_2CH_2$ |
| 10 | t-butyl | ethyl | ethyl |
| 11 | t-butyl | n-propyl | n-propyl |
| 12 | t-butyl | —$CH_2CH_2OCH_3$ | —$CH_2CH_2OCH_3$ |
| 13 | t-butyl | i-butyl | i-butyl |
| 14 | t-butyl | methyl | i-butyl |
| 15 | t-butyl | methyl | i-propyl |
| 16 | t-butyl | ethyl | i-butyl |
| 17 | t-butyl | n-propyl | i-butyl |
| 18 | t-butyl | ethyl | i-propyl |
| 19 | t-octal | methyl | methyl |
| 20 | t-octal | ethyl | methyl |
| 21 | t-octyl | —$CH_2CH_2OCH_2CH_2$ | —$CH_2CH_2OCH_2CH_2$ |
| 22 | t-octal | ethyl | ethyl |
| 23 | t-octal | i-butyl | methyl |
| 24 | t-octal | n-propyl | i-propyl |
| 25 | i-propyl | i-propyl | i-butyl |
| 26 | i-propyl | i-propyl | methylallyl |
| 27 | t-octyl | n-propyl | n-propyl |
| 28 | i-propyl | i-propyl | i-propyl |
| 29 | n-butyl | ethyl | ethyl |
| 30 | i-propyl | i-propyl | sec-butyl |

In another preferred embodiment, the secondary or tertiary amine is a six or five membered cyclic amine (i.e., a heterocycle) of chemical formulae (II) and (III), respectively:

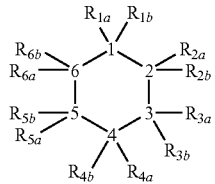

(II)

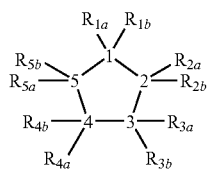

(III)

wherein, for the six-membered heterocycle of formula (II), at least one atom and no more than three atoms at positions 1-6 are nitrogen, the heterocycle can include an oxygen, phosphorous or sulfur atom, and the remaining atoms are carbon. For the five-membered heterocycle of formula (III), at least one atom and no more than three atoms at any one of positions 1-5 are nitrogen, the heterocycle can contain an oxygen, phosphorous or sulfur atom, and the remaining atoms are carbon. The heterocycles of formulae (II) or (III) can be unsaturated, partially unsaturated, or completely saturated. $R_{1a}$, $R_{1b}$, $R_{2a}$, $R_{2b}$, $R_{3a}$, $R_{3b}$, $R_{4a}$, $R_{4b}$, $R_{5a}$, and $R_{5b}$, and additionally $R_{6a}$ and $R_{6b}$ in the case of a six membered heterocycle of formula (II), are independently selected from an electron pair, hydrogen, straight or branched chain alkyl, alkene or alkoxy having 1 to 8 carbon atoms, and cycloalkyl having 3 to 8 carbon atoms, provided that the presence of $R_{1a}$ and/or $R_{1b}$, $R_{2a}$ and/or $R_{2b}$, $R_{3a}$ and/or $R_{3b}$, $R_{4a}$ and/or $R_{4b}$, $R_{5a}$ and/or $R_{5b}$, and $R_{6a}$ and/or $R_{6b}$, is dictated by the valence of the atom at heterocycle positions 1-6, respectively. For example, in the case of nitrogen atoms, only $R_{xa}$ (where x is any one of 1-6 for heterocycles of formula (II) and 1-5 for heterocycles of formula (III)) is present at that atom, and where the ring is partially unsaturated or completely saturated, the nitrogen atom $R_{xa}$ substituent can represent an electron pair. For carbon ring atoms, in the case of unsaturated heterocycles, both $R_{xa}$ and $R_{xb}$ are present at that atom, and where the heterocycle is partially unsaturated or completely saturated, one of the carbon atom $R_{xa}$ or $R_{xb}$ substituents can represent an electron pair.

Preferred six-membered heterocycles include substituted or unsubstituted piperidine, piperazine, pyridine, pyrazine, pyridazine and pyrimidine. Preferred five-membered heterocycles include substituted or unsubstituted 1H-Pyrrole, pyrrolidine, 3-pyrroline, imidazole, pyrazole, 2-pyrazoline and triazole. An example of a heterocycle stabilizer is 1,2,2,6,6-pentamethylpiperidine (stabilizer compound 31).

Secondary and tertiary amines can also be cyclic amines (i.e., heterocycles) represented by the three and four membered heterocycles of chemical formulae (IV) and (V), respectively:

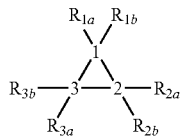

(IV)

-continued

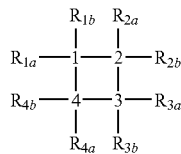

wherein, for the three-membered heterocycle of formula (IV), at least one atom and no more than two atoms at positions 1-3 are nitrogen, the heterocycle can contain an oxygen, phosphorous or sulfur atom, and the remaining atoms are carbon. For the four-membered heterocycle of formula (V), at least one atom and no more than two atoms at any one of positions 1-4 are nitrogen, the ring can contain an oxygen, phosphorous or sulfur atom, and the remaining atoms are carbon. The rings of formulae (IV) or (V) can be unsaturated, partially unsaturated, or completely saturated. $R_{1a}$, $R_{1b}$, $R_{2a}$, $R_{2b}$, $R_{3a}$ and $R_{3b}$ and additionally $R_{4a}$ and $R_{4b}$ in the case of a four membered heterocycle of formula (V), are independently selected from an electron pair, hydrogen, straight or branched chain alkyl, alkene or alkoxy having 1 to 8 carbon atoms, and cycloalkyl having 3 to 8 carbon atoms, provided that the presence of $R_{1a}$ and/or $R_{1b}$, $R_{2a}$ and/or $R_{2b}$, $R_{3a}$ and/or $R_{3b}$ and $R_{4a}$ and/or $R_{4b}$ is dictated by the valence of the atom at heterocycle positions 1-4, respectively. In the case of nitrogen atoms, only $R_{xa}$ (where x is any one of 1-3 for rings of formula (IV) and 1-4 for heterocycles of formula (V)) is present at that atom, and where the heterocycle is partially unsaturated or completely saturated, the nitrogen atom $R_{xa}$ substituent can represent an electron pair. For carbon atoms, in the case of unsaturated heterocycles, both $R_{xa}$ and $R_{xb}$ are present at that atom, and where the heterocycle is partially unsaturated or completely saturated one of the carbon atom $R_{xa}$ or $R_{xb}$ substituents can represent an electron pair. A preferred three-membered ring is ethyleneimine.

In another embodiment, aminoborohydrides suitable for use as BD-THF stabilizers are represented by formula (VI):

$$R_1R_2NBH_3^-M^+ \qquad (VI)$$

where $R_1$ and $R_2$ are independently selected from straight or branched chain alkyl, alkene or alkoxy having 1 to 8 carbon atoms, and cycloalkyl having 3 to 8 carbon atoms and $M^+$ is a metal cation. Suitable metal cations include, for example, lithium, sodium and potassium. Aminoborohydrides of formula (VI) are known in the art. See for example U.S. Pat. No. 5,466,798 to Singaram, et al.

In another preferred embodiment, sulfides suitable for use as BD-THF stabilizers are represented by sulfides of formula (VIIa) and sulfoxides of formula (VIIb):

$$SR_4R_5 \qquad (VIIa);$$

$$S(O)R_4R_5 \qquad (VIIb)$$

wherein $R_4$ and $R_5$ are independently straight or branched chain alkyl, alkene or alkoxy having from 1 to 8 carbon atoms. In one embodiment the alkoxy is of the formula $(CH_2CH_2O)_n$ where n is 1 to 3. Sulfides of formula (VIIa) are known in the art. See, for example, U.S. Pat. Nos. 5,504,240 and 5,567,849 to Brown, both of which are incorporated by reference. Sulfoxides of formula (VIIb) are known in the art. See, for example, U.S. Pat. No. 4,029,712 to Tsuchihashi et al., which is incorporated by reference.

Alternatively, $R_4$ and $R_5$ and the sulfur atom can form a substituted or unsubstituted heterocycle containing from 3 to 8 atoms. One such preferred heterocycle is thiophene. The heterocycle ring can be substituted with one or more groups independently selected from straight or branched chain alkyl, alkene or alkoxy having 1 to 8 carbon atoms, and cycloalkyl having 3 to 8 carbon atoms.

Representative sulfide stabilizers of formula (VIIa) are indicated in Table 2 below. Representative sulfoxide stabilizers of formula (VIIb) also have the substituents as indicated in Table 2.

TABLE 2

| Stabilizer | $R_4$ | $R_5$ |
|---|---|---|
| 32 | i-amyl | ethyl |
| 33 | i-amyl | methyl |
| 34 | i-amyl | t-butyl |
| 35 | i-amyl | i-amyl |
| 36 | 2-methoxyethyl | 2-methoxyethyl |
| 37 | 2-methoxyethyl | ethyl |
| 38 | t-butyl | ethyl |
| 39 | methyl | methyl |
| 40 | $(CH_2CH_2O)_2$ | ethyl |
| 41 | $(CH_2CH_2O)_2$ | t-butyl |
| 42 | $(CH_2CH_2O)_2$ | i-amyl |
| 43 | $(CH_2CH_2O)_3$ | ethyl |
| 44 | $(CH_2CH_2O)_3$ | t-butyl |
| 45 | $(CH_2CH_2O)_3$ | i-amyl |

In still another preferred embodiment, phosphines suitable for use as BD-THF stabilizers are represented by formulae (VIII), (IX) and (X):

For the phosphine of formula (VIII), $R_6$, $R_7$ and $R_8$ are independently selected from hydrogen, straight or branched chain alkyl or alkyne having from 1 to 14 carbon atoms, substituted or unsubstituted cycloalklyl having from 3 to 8 carbon atoms, and substituted or unsubstituted phenyl, provided, however, only one of $R_6$, $R_7$ and $R_8$ is hydrogen. Preferred cycloalkyls are cyclopentyl and cyclohexyl. Preferred substituted phenyls are xylyl (dimethylbenzene) and tolyl (methylbenzene).

Representative phosphine stabilizers of formula (VIII) are indicated in Table 3 below.

TABLE 3

| Stabilizer | $R_6$ | $R_7$ | $R_8$ |
|---|---|---|---|
| 46 | H | i-butyl | i-butyl |
| 47 | H | phenyl | phenyl |
| 48 | tetradecene-1 | phenyl | phenyl |
| 49 | H | ethyl | ethyl |

TABLE 3-continued

| Stabilizer | R$_6$ | R$_7$ | R$_8$ |
| --- | --- | --- | --- |
| 50 | tetradecene-1 | ethyl | ethyl |
| 51 | n-butyl | n-butyl | n-butyl |
| 52 | H | n-butyl | n-butyl |
| 53 | phenyl | phenyl | phenyl |
| 54 | xylyl | xylyl | xylyl |
| 55 | tolyl | tolyl | tolyl |
| 56 | allyl | allyl | i-butyl |
| 57 | allyl | allyl | cyclohexyl |
| 58 | allyl | allyl | sec-butyl |
| 59 | allyl | allyl | hexyl |
| 60 | allyl | allyl | cyclopentyl |

For the phosphine of formula (IX), $R_9$, $R_{10}$, $R_{11}$, $R_{12}$ and $R_{13}$ are independently selected from hydrogen, straight or branched chain alkyl or alkyne having from 1 to 14 carbon atoms, substituted or unsubstituted cycloalklyl having from 3 to 8 carbon atoms, and substituted or unsubstituted phenyl. Only one or two of $R_9$, $R_{10}$, $R_{11}$, $R_{12}$ and $R_{13}$ can be hydrogen. Preferred cycloalkyls are cyclopentyl and cyclohexyl. Preferred substituted phenyls are xylyl and tolyl.

A representative phosphine stabilizer of formula (IX) is 1,1,3,3-tetramethylbutylphosphine.

For the phosphine oxides of formula (X), $R_{14}$, $R_{15}$ and $R_{16}$ are independently selected from hydrogen, straight or branched chain alkyl or alkyne having from 1 to 14 carbon atoms, substituted or unsubstituted cycloalklyl having from 3 to 8 carbon atoms, and substituted or unsubstituted phenyl. Only one of $R_{14}$, $R_{15}$ and $R_{16}$ can be hydrogen. Preferred cycloalkyls are cyclopentyl and cyclohexyl. Preferred substituted phenyls are xylyl and tolyl.

Representative phosphine oxide stabilizers of formula (X) have the substituents as indicated in Table 3 above except where $R_6$, $R_7$ and $R_8$ as indicated in that table are instead $R_{14}$, $R_{15}$ and $R_{16}$, respectively.

Alternatively, any two of $R_6$-$R_8$, $R_9$-$R_{13}$ or $R_{14}$-$R_{16}$ and the phosphorus atom can form a substituted or unsubstituted phosphine heterocycle containing from 3 to 8 atoms. Phosphine heterocycles are known in the art. See, for example, U.S. Pat. No. 4,503,178 to Green and U.S. Pat. No. 6,545,183 B1 to Berens, both of which are incorporated by reference. The heterocycle can be substituted with any of the groups defined for $R_1$ above.

Phosphines of formulae (VIII), (IX) and (X) are known in the art. See, for example, U.S. Pat. No. 4,008,282 to Townsend et al., U.S. Pat. No. 4,390,729 to Oswald, U.S. Pat. No. 5,100,854 to Maeda et al., U.S. Pat. No. 5,250,736 to Micklethwaite et al., U.S. Pat. No. 5,260,485 to Calbick et al. and U.S. Pat. No. 5,663,419 to Sugiya et al., all of which are incorporated by reference.

In yet another embodiment, the stabilizer is a borate. Without being bound to any particular, it has been proposed that these stabilizers react/exchange with borane according to reaction scheme (4):

(4)

wherein y is 1 to 3 and z is independently 0 or 1, but wherein at least one z must be 1, and wherein free deuterated or partially deuterated borane ($BD_yH_{3-y}$) is scavenged thereby stabilizing BD-THF assay and increasing the SADT temperature. The borate stabilizer, for example, may be represented by formulae (XI) or (XII):

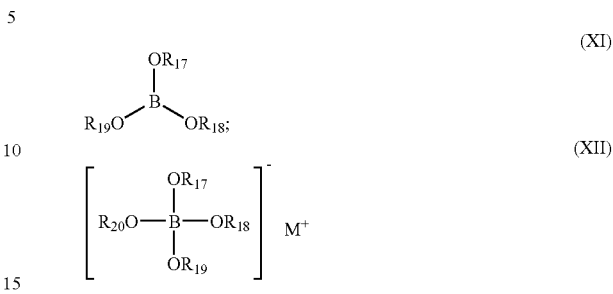

wherein $R_{17}$, $R_{18}$, $R_{19}$ and $R_{20}$ are independently selected from a straight or branched chain alkyl or alkenyl having from 1 to 8 carbon atoms. $M^+$ is a suitable metallic counterion such as, for example, sodium or potassium. A representative borate-based stabilizer of formula (XI) is $B(OCH_2CH_2CH_2CH_3)_3$.

As previously noted, the stabilizers of the present invention may optionally be supported on or in a polymer matrix, or on or in an inert carrier such as titanium dioxide, silicone dioxide, alumina, carbon or zeolite. Advantageously, a polymer matrix possesses both barrier properties and structural integrity. Suitable polymers include, for example, polyolefin, polyvinyl chloride, nitrile, polyethylene terephthalate (e.g., Mylar® or "PET"), polyurethane, polystyrene, polytetrafluoroethylene (e.g., Teflon® or "PTFE"), silicone rubber and polyvinylidene chloride. The stabilizer can bound to the polymer or carrier at any one of the positions indicated by $R_1$ through $R_{20}$ and $R_{1a}$ through $R_{6b}$, or at a substituted group designated by any of $R_1$ through $R_{20}$ and $R_{1a}$ through $R_{6b}$. Alternatively, any of the stabilizers of the present invention can be included, such as by adsorption or absorption, within the matrix of a porous polymer or inert carrier.

The stabilizer is useful for the storage and transportation of BD-THF solutions, as well as for the return of substantially empty BD-THF containers for refilling. The stabilizer can be included in the BD-THF solution in a variety of ways. For instance, first, a stabilizer that is essentially soluble in or miscible with THF can be added to the BD-THF solution. Second, a substantially insoluble stabilizer or stabilizer matrix can be used. In the second case, the stabilizer can be isolated within the BD-THF storage container to prevent the stabilizer from settling out of solution. Suitable isolation methods include, for example: coating the inside of the storage container or a container insert with the stabilizer; placing the stabilizer within a storage container insert barrier device that is permeable to gas and liquid, but is essentially impermeable to the insoluble stabilizer, such as, for example a perforated sphere or pipe, shaped or formed screen, or microperforated sealed bag. Third, stabilizers can be isolated from the storage container as described above to enable a time-release addition to the BD-THF solution. Advantageously, container stabilizer inserts facilitate ease of introduction and removal of the stabilizer to and from the storage container. It is noted that the container stabilizer isolation methods are not limited to substantially insoluble and sparingly soluble stabilizers, but can also be used to contain essentially soluble or miscible stabilizers thereby achieving the benefits of time release and ease of introduction to the BD-THF solution.

Storage vessel geometry can affect the rate of decomposition of both stabilized and unstabilized BD-THF solutions. In particular, BD-THF decomposition rate has been found to vary positively, and linearly, with the surface area of the BD-THF solution exposed to the container vessel void volume. For containers of similar volume, tall vertical vessels having reduced diameter are preferred over shorter vessels having a greater diameter. Therefore, a storage vessel having dimensions selected to minimize the contained BD-THF solution surface area to volume ratio are preferred over vessels of similar volume but having dimensions that yield a higher surface area to volume ratio. A ratio of the surface area of the BD-THF composition gas-solution interface to the volume of the composition in the sealed container is preferably about 2 cm$^2$ per liter to about 200 cm$^2$ per liter when the BD-THF solution comprises at least about 0.5 moles per liter BD-THF and the deuteroborane is of the formula $BD_yH_{3-y}$ wherein y is from 1 to 3. Moreover, it is preferred to store both stabilized and unstabilized BD-THF solutions in vertical vessels rather than horizontal vessels because the surface area interface between the BD-THF solution and the vessel gaseous void volume is minimized.

EXAMPLES

The following example will illustrate the various features of the present invention.

Example 1

A stabilized solution of deuterated borane (BD$_3$) was prepared in a diborane generation apparatus comprising a one liter generator flask connected to a one liter receiver flask by a gas transfer line. Two one liter traps were placed in series in the transfer line. The first trap was filled with 2,5,8,11-tetraoxadodecane for scavenging BF$_3$ vapors escaping the generator and the second trap served as a cryo trap.

Sodium borodeuteride (98 atom %, 42 grams, 1 mol) and 2,5,8,11-tetraoxadodecane (175 mL, 0.968 mol) were combined in the generator flask with agitation at room temperature. A white slurry formed that was cooled to about 0-5° C. Tetrahydrofuran (600 g, 9 mol) was charged to the receiver and cooled to about −5 to 0° C. Boron trifluoride etherate (105 mL, 0.826 mol) was charged to the generator over about 90 minutes. The generator and receiver temperatures remained at about 0-5° C. and about −5 to 0° C., respectively, during the addition. Nitrogen gas was flushed through the generator to facilitate B$_2$D$_6$ removal. After the boron trifluoride etherate addition was complete, a 40° C. hot water bath was placed around the generator flask and agitation was continued for about 1 hour. After one hour the receiver was disconnected from the generator.

The receiver solution volume was measured to be 642 mL. Analysis of that solution by hydrogen evolution indicated a 1.05 molar BD$_3$ solution having a yield of 82% of theoretical. The solution was stabilized with 0.005 molar N-isopropyl-N-methyl-tert-butylamine (0.524 mL, 0.00311 mol).

What is claimed is:

1. A composition comprising
   (a) a deuteroborane-tetrahydrofuran complex, (b) tetrahydrofuran and (c) a stabilizer wherein:
   (i) the stabilizer is selected from the group consisting of amines, sulfides, phosphines, aminoborohydrides, borates, and combinations thereof,
   (ii) the concentration of the deuteroborane-tetrahydrofuran complex in the composition is at least about 0.5 moles per liter,
   (iii) the molar ratio of the deuteroborane-tetrahydrofuran complex to the stabilizer is at least 10:1, and
   (iv) the deuteroborane is of the formula $BD_yH_{3-y}$ wherein y is from 1 to 3.

2. A method of storing a composition containing at least about 0.5 moles per liter of a deuteroborane-tetrahydrofuran complex in a solvent system comprising tetrahydrofuran, the method comprising
   sealing a container having a storage volume of at least 0.10 liters, the sealed container containing a liquid in the storage volume, the liquid comprising tetrahydrofuran, the deuteroborane-tetrahydrofuran complex, and a stabilizer selected from the group consisting of amines, sulfides, phosphines, aminoborohydrides, borates, and combinations thereof
   wherein the molar ratio of the deuteroborane-tetrahydrofuran complex to the stabilizer is at least 10:1 and the deuteroborane is of the formula $BD_yH_{3-y}$ wherein y is from 1 to 3.

3. The composition of claim 1 wherein y is 3.

4. The composition of claim 1 wherein the molar ratio of the deuteroborane-tetrahydrofuran complex to the stabilizer is from about 10:1 to about 10000:1.

5. The composition of claim 1 wherein the concentration of the deuteroborane-tetrahydrofuran complex is about 0.5 moles per liter to about 2.5 moles per liter.

6. The composition of claim 1 wherein the amine stabilizer is of formula (Ia), formula (Ib) or formula (Ic):

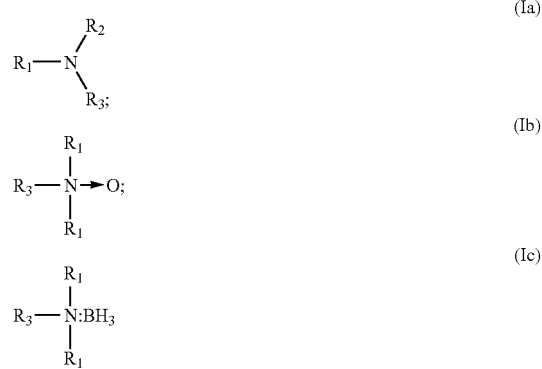

wherein
   R$_1$ is selected from hydrogen, phenyl, straight or branched chain alkyl, alkene or alkoxy having 1 to 8 carbon atoms, cycloalkyl having 3 to 8 carbon atoms, and silyl tri-substituted with substituents independently selected from hydrogen, phenyl, and straight or branched chain alkyl, alkene or alkoxy having 1 to 8 carbon atoms, and
   R$_2$ and R$_3$ are independently selected from phenyl, straight or branched chain alkyl, alkene or alkoxy having 1 to 8 carbon atoms, cycloalkyl having 3 to 8 carbon atoms, and silyl tri-substituted with substituents independently selected from hydrogen, phenyl, and straight or branched chain alkyl, alkene or alkoxy having 1 to 8 carbon atoms.

7. The composition of claim 6 wherein
   R$_1$ is selected from the group consisting of hydrogen, methyl, ethyl, n-propyl, i-propyl, n-butyl, i-butyl, t-butyl, sec-butyl, t-octyl, ethyl ether, ethyl methyl ether, methylallyl, phenyl and trimethylsilyl, and $R_2$ and $R_3$ are independently selected from the group consisting of methyl, ethyl, n-propyl, i-propyl, n-butyl, i-butyl, t-butyl, sec-butyl, t-octyl, ethyl ether, ethyl methyl ether, methylallyl, phenyl and trimethylsilyl.

8. The composition of claim 1 wherein the amine stabilizer is a metal amide of formula (Id):

$$R_1R_2N^-M^+ \qquad (Id)$$

wherein $R_1$ and $R^2$ are independently selected from hydrogen, phenyl, straight or branched chain alkyl, alkene or alkoxy having 1 to 8 carbon atoms, cycloalkyl having 3 to 8 carbon atoms, and silyl tri-substituted with substituents independently selected from hydrogen, phenyl, and straight or branched chain alkyl, alkene or alkoxy having 1 to 8 carbon atoms, and $M^+$ is a metal counterion.

9. The composition of claim 8 wherein $R_1$ and $R_2$ are independently selected from the group consisting of methyl, ethyl, n-propyl, i-propyl, n-butyl, i-butyl, t-butyl, sec-butyl, t-octyl, ethyl ether, ethyl methyl ether, methylallyl, phenyl and trimethylsilyl, and $M^+$ is selected from sodium, potassium and lithium.

10. The composition of claim 1 wherein the amine stabilizer comprises a heterocycle corresponding to formula (II):

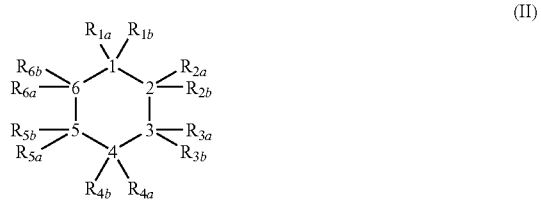

wherein the heterocycle contains one or more heteroatoms selected from nitrogen, oxygen, phosphorous and sulfur, wherein at least one atom and no more than three atoms at ring positions 1-6 of the heterocycle are nitrogen, no more than one atom at heterocycle positions 1-6 is oxygen, phosphorous or sulfur, and the remaining atoms at heterocycle positions 1-6 are carbon, the heterocycle is unsaturated, partially unsaturated, or completely saturated, wherein $R_{1a}$, $R_{1b}$, $R_{2a}$, $R_{2b}$, $R_{3a}$, $R_{3b}$, $R_{4a}$, $R_{4b}$, $R_{5a}$, $R_{5b}$, $R_{6a}$ and $R_{6b}$ are independently selected from an electron pair, hydrogen, straight or branched chain alkyl, alkene or alkoxy having 1 to 8 carbon atoms, and cycloalkyl having 3 to 8 carbon atoms, provided that the presence of $R_{1a}$ and/or $R_{1b}$, $R_{2a}$ and/or $R_{2b}$, $R_{3a}$ and/or $R_{3b}$, $R_{4a}$ and/or $R_{4b}$, $R_{5a}$ and/or $R_{5b}$, and $R_{6a}$ and/or $R_{6b}$, is dictated by the valence of the atom at heterocycle positions 1-6, respectively.

11. The composition of claim 10 wherein the heterocycle of formula (II) is selected from substituted or unsubstituted piperidine, piperazine, pyridine, pyrazine, pyridazine and pyrimidine.

12. The composition of claim 1 wherein the amine stabilizer is a heterocycle corresponding to formula (III):

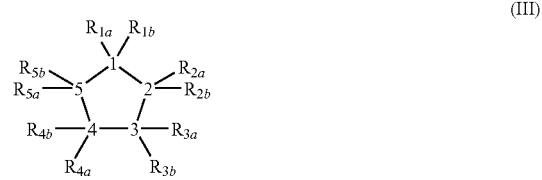

wherein the heterocycle contains one or more heteroatoms selected from nitrogen, oxygen, phosphorous and sulfur, wherein at least one atom and no more than three atoms at heterocycle positions 1-5 are nitrogen, no more than one atom is oxygen, phosphorous or sulfur, and the remaining atoms at heterocycle positions 1-5 are carbon, the heterocycle is unsaturated, partially unsaturated, or completely saturated, wherein $R_{1a}$, $R_{1b}$, $R_{2a}$, $R_{2b}$, $R_{3a}$, $R_{3b}$, $R_{4a}$, $R_{4b}$ $R_{5a}$ and $R_{5b}$ are independently selected from an electron pair, hydrogen, straight or branched chain alkyl, alkene or alkoxy having 1 to 8 carbon atoms, and cycloalkyl having 3 to 8 carbon atoms, provided that the presence of $R_{1a}$ and/or $R_{1b}$, $R_{2a}$ and/or $R_{2b}$, $R_{3a}$ and/or $R_{3b}$, $R_{4a}$ and/or $R_{4b}$, and $R_{5a}$ and/or $R_{5b}$, is dictated by the valence of the atom at heterocycle positions 1-5, respectively.

13. The composition of claim 12 wherein the heterocycle of formula (III) is selected from substituted or unsubstituted 1H-Pyrrole, pyrrolidine, 3-pyrroline, imidazole, pyrazole, 2-pyrazoline and triazole.

14. The composition of claim 10 or claim 12 wherein the heterocycle contains one nitrogen heteroatom and a sulfur or oxygen heteroatom.

15. The composition of claim 1 wherein the aminoborohydride is of formula (VI):

$$R_1R_2NBH_3^-M^+ \qquad (VI)$$

wherein $R_1$ and $R_2$ are independently selected from straight or branched chain alkyl, alkene or alkoxy having 1 to 8 carbon atoms, and cycloalkyl having 3 to 8 carbon atoms, and $M^+$ is a metal cation selected from lithium, sodium and potassium.

16. The composition of claim 1 wherein the phosphine is of formula (VIII):

wherein $R_6$, is selected from hydrogen, straight or branched chain alkyl, alkene or alkyne having from 1 to 14 carbon atoms, substituted or unsubstituted cycloalklyl having from 3 to 8 carbon atoms, and substituted or unsubstituted phenyl, and $R_7$ and $R_8$ are independently selected from straight or branched chain alkyl, alkene or alkyne having from 1 to 14 carbon atoms, substituted or unsubstituted cycloalkyl having from 3 to 8 carbon atoms, and substituted or unsubstituted phenyl.

17. The composition of claim 16 wherein the cycloalkyl is selected from cyclopentyl and cyclohexyl, and the phenyl is selected from xylyl and tolyl.

18. The composition of claim 16 wherein any two of $R_6$-$R_8$ and the phosphorus atom form a substituted or unsubstituted heterocycle containing from 3 to 8 atoms.

19. The composition of claim 1 wherein the borate is of formulae (XI) or (XII):

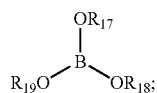

(XI)

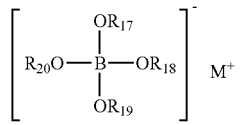

(XII)

wherein
$R_{17}$, $R_{18}$, $R_{19}$ and $R_{20}$ are independently selected from an alkyl or alkenyl having from 1 to 8 carbon atoms, and $M^+$ is a metal counterion.

20. The composition of claim 1 wherein the stabilizer is supported
on at least a portion of the surface of a polymer matrix or an inert carrier,
in at least a portion of an internal matrix or pores of a polymer matrix or an inert carrier, or
on at least a portion of the surface and at least a portion of the internal matrix or pores of a polymer matrix or an inert carrier
wherein the polymer matrix or inert carrier are immersed in the composition.

21. The composition of claim 20 wherein the inert carrier is selected from titanium dioxide, silicone dioxide, alumina, carbon and zeolite.

22. The composition of claim 20 wherein the polymer is selected from polyolefin, polyvinyl chloride, nitrile, polyethylene terephthalate, polyurethane, polystyrene, polytetrafluoroethylene, silicone rubber and polyvinylidene chloride.

23. The composition of claim 1 wherein the composition is a solution.

24. The method of claim 2 wherein y is 3.

25. The method of claim 2 wherein the molar ratio of the deuteroborane-tetrahydrofuran complex to the stabilizer is from about 10:1 to about 10000:1.

* * * * *

UNITED STATES PATENT AND TRADEMARK OFFICE
CERTIFICATE OF CORRECTION

| | | |
|---|---|---|
| PATENT NO. | : 7,750,168 B2 | Page 1 of 1 |
| APPLICATION NO. | : 11/672808 | |
| DATED | : July 6, 2010 | |
| INVENTOR(S) | : Mark C. Potyen et al. | |

It is certified that error appears in the above-identified patent and that said Letters Patent is hereby corrected as shown below:

Col. 14, Formula 1b:

" $\begin{matrix} N \\ | \\ R_1 \end{matrix}$ " should read -- $\begin{matrix} N \\ | \\ R_2 \end{matrix}$ --

Col. 14, Formula 1c:

" $\begin{matrix} N \\ | \\ R_1 \end{matrix}$ " should read -- $\begin{matrix} N \\ | \\ R_2 \end{matrix}$ --

Col. 15, line 59: "$R_{1b}, R_2$" should read --$R_{1b}, R_2$--

Col. 15, line 62: "1-6,respectively" should read --1-6, respectively--

Col. 16, line 29: "$R_{2b} R_{3b}$" should read --$R_{2b}, R_{3b}$--

Col. 16, line 31: "1-5,respectively" should read --1-5, respectively--

Col. 16, line 16: "$R_6$," should read --$R_6$--

Signed and Sealed this
Twenty-second Day of November, 2011

David J. Kappos
*Director of the United States Patent and Trademark Office*